United States Patent Office 3,342,849
Patented Sept. 19, 1967

3,342,849
PRODUCTION OF ALIPHATIC NITRILES
William F. Brill, Skillman, Alfio J. Besozzi, East Brunswick, and Joseph H. Finley, Edison, N.J., assignors to Petro-Tex Chemical Corporation, Houston, Tex., a corporation of Delaware
No Drawing. Filed Nov. 1, 1963, Ser. No. 320,938
5 Claims. (Cl. 260—465.3)

This invention relates to a process for producing aliphatic nitriles and relates more particularly to a vapor phase process for the production of unsaturated aliphatic nitriles from olefins.

Unsaturated nitriles may be prepared by reacting an olefin with ammonia and oxygen. In these reactions the ammonia is not efficiently utilized in the ammoxidation of olefins to nitriles, a large percent of the ammonia being lost or destroyed during the ammoxidation process. It is therefore an object of this invention to provide an efficient, economic process for the production of unsaturated nitriles from ammonia and olefins in improved yields. Still another object of this invention is to provide a process for the production of high yields of unsaturated nitriles so as to efficiently utilize the ammonia and olefin reactants. These objects are accomplished by reacting, at elevated temperature, mixtures of an alpha-olefin, ammonia and oxygen over a molybdenum oxide or a molybdenum oxide base catalyst under certain critical reaction conditions, especially a critical ratio of catalyst surface to free volume or space in the reaction zone, as with a reactor tube coated with the catalyst.

Alpha-olefins containing from 3 to 6 carbon atoms may be ammoxidized by this process. For example, such alpha-olefins as propylene, isobutylene, butene-1, 2-methylbutene-3, 2-methylbutene-1, hexenes, isohexenes, and the like. Alpha olefins containing from 3 to 4 carbon atoms are generally preferred. Certain diolefins such as butadiene or mixtures of the above described alpha olefins may also be advantageously utilized. Isobutylene is a preferred reactant to make methacrylonitrile.

The catalysts employed in carrying out this invention contain molybdenum oxide alone or in admixture with an oxide of a metal selected from groups VB, VIB, and VIII of the periodic table. Particularly suitable, for example, are oxides of vanadium, chromium, tungsten, iron and nickel. Combinations of molybdenum oxide and chromium oxide or molybdenum oxide and vanadium oxide are preferred. The metal oxides may be combined with one another in ratios of from about 10 to 90 parts of oxides of metals selected from groups VB, VIB, and VIII of the periodic table combined with 90 to 10 parts molybdenum oxide. Specific metal oxides in various oxidation states such as molybdenum sesquioxide, molybdenum pentoxide, molybdenum trioxide and molybdenum dioxide have been found to be useful in the practice of this invention. The catalyst may also contain small amounts of phosphorus compounds such as phosphorus pentoxide, phosphorus acid, phosphoric acid and the like. The amounts of the phosphorus compound added is generally less than 20 percent by weight of the total catalyst mixture. Specific combinations of metal oxides that have given improved yields of unsaturated nitriles in accordance with this invention include, for example, combinations of molybdenum oxide, chromium oxide or vanadium pentoxide, and phosphorus pentoxide. Weight percents from about 25 percent to 85 percent of molybdenum oxide, 10 percent to 60 percent chromium oxide and 5 percent to 15 percent phosphorus pentoxide are very effective in utilizing the raw materials in producing unsaturated nitriles. Catalysts of 25 to 89 percent of molybdenum oxide, 10 to 75 percent of vanadium pentoxide and 0.1 to 15 percent phosphorus pentoxide are also effective.

The catalysts may be deposited in the reaction zone from aqueous slurries, by sublimation, or other suitable means.

A novel feature of this invention is the necessity for maintaining specific ratios of catalyst surface to free volume in the reaction zone during the ammoxidation reaction. Essentially, coated reactor tubes are employed rather than fixed beds of small particle size catalysts. For purposes of this invention, catalyst surface area may be defined as that area or surface of the catalyst within the reaction zone which is in contact with the reactants. Catalyst surface areas may be determined by several well known methods such as by the Braunauer-Emmet-Teller nitrogen adsorption method. The Braunauer-Emmet-Teller method is described by W. B. Innes in Analytical Chemistry, vol. 23, page 759 (1951). Free volume may be defined as the free or open space in the reaction zone. Catalyst surface to free volume ratios between about 0.01 to 50 square inches per cubic inch and more preferably between 0.1 to 25 square inches of catalyst surface per cubic inch of reaction zone free volume have produced high yields of unsaturated nitriles with excellent utilization of ammonia. A ratio of catalyst surface area to reaction zone free volume greater than 100 square inches of catalyst surface area per cubic inch of free volume is to be avoided. For example, in one experiment where the molybdenum oxide catalyst surface area to reaction zone free volume exceeded 100 square inches of catalyst surface per cubic inch of free volume, only about 5 to 15 percent of the ammonia consumed was utilized in producing unsaturated nitriles. The remaining 85 to 95 percent ammonia consumed was oxidized to nitrogen oxide or decomposed to nitrogen and hydrogen. If the catalyst surface area to reaction zone free volume is reduced to below 0.01 square inches per cubic inch of reaction zone free volume, the yields of unsaturated nitriles are negligible. By reacting an olefin, such as isobutylene with an ammonia-oxygen mixture over a molybdenum oxide type catalyst within the preferred range of catalyst surface area to reaction zone free volume, that is, between 0.1 to 25 square inches of catalyst surface per cubic inch of reaction zone free volume, ammonia efficiencies as high as 93 mol percent may be obtained. The preferred ratios of catalyst surface area to reaction zone free volume is obtained by depositing the catalyst actives on reactor tube walls as from an aqueous catalyst slurry or solution or by sublimation. Preferably the reactor will consist of tube bundles with each reactor tube approximately .1 to 5, more preferably ½ to 3 inches in diameter and 1 to 15 feet long, more preferably 2 to 8 feet.

Oxygen is added as elemental oxygen and may contain an inert diluent such as helium, nitrogen and the like. The use of air in this process has been found to be advantageous. The concentration of oxygen as air in the reaction mixture may be varied depending, in part, on the choice of catalyst and reaction conditions. Generally the oxygen to alpha olefin mol ratio will be between about 8 mols to 0.1 mol of oxygen per mol of alpha olefin and preferably between about 4 mols to 1 mol of oxygen per mol of alpha olefin. Mol ratios as high as 12 mols of oxygen per mol of alpha olefin have been used. Generally, mol ratios of oxygen to hydrocarbon greater than 3 to 1 will be utilized only in lean streams, i.e., containing less than 20 percent olefin. The use of excessively large amounts of oxygen is generally avoided at relatively high temperatures since at these conditions the formation of combustion products and lower ammonia and olefin selectivities may result. If the oxygen ratio is too low the rate of conversion, for example, of isobutylene to methacrylonitriles is substantialy reduced.

The ammonia to alpha-olefin ratio may be as low as 0.1 and as high as 15 mols of ammonia per mol of alpha olefin. Usually the reaction will be conducted at ammonia to olefin mol ratios between about 1 to 9 mols of ammonia per mol of olefin and preferably between about 2 to 4 mols of ammonia per mol of alpha olefin. The ammonia may be introduced into the reaction mixture as either a liquid or gas. The ammonia may be added in a solvent such as water and preheated prior to admixing with the reactants.

In addition to oxygen and ammonia, inert diluents may be added to the reaction mixture. Materials which are substantially unreactive with the reactants or reaction products may be used as a diluent. Examples of suitable inert diluents that may be used are helium, nitrogen, methane, and the like. Steam is a particularly valuable constituent of the reaction mixture. In the presence of steam, the ammonia selectivity is substantially higher than in runs made without steam. Diluents such as steam and mixtures of steam and nitrogen have given excellent results. The amount of diluent utilized in this invention is varied from between 1.5 to 45 mols of steam per mol of alpha olefin. Mol ratios from between about 3 to 20 mols of steam per mol of olefin are preferred. For example, a molar ratio of steam to isobutylene of between 4.5 and 9 have given excellent yields of methacrylonitrile at normal operating conditions.

The reaction is conducted at temperatures between about 300° C. to about 800° C. While good yields of unsaturated nitriles have been obtained at temperatures between about 450° C. and 650° C., the reaction is preferably maintained at reaction temperatures between about 500° C. and 600° C. The reaction temperature may be defined as the maximum temperature obtained in the reaction zone during the production of unsaturated nitriles. Although this reaction may be conducted at superatmospheric or subatmospheric pressures, pressures of between 0.1 atmospheres and 10 atmospheres have given excellent results and are generally preferred.

The flow rates of the reactants may be varied, with flow rates producing contact or residence times between about 0.01 second and 20 seconds being used. Preferably residence or contact times between about 0.1 and 5 seconds are employed. Residence time is the calculated dwell time the reactants spend in the reaction zone at reaction temperature and pressure, assuming that the volume of feed and the volume of reaction product remain constant.

The alpha-olefins may be added to the reaction zone separately or as a mixture with either the ammonia or oxygen. Preferably a mixture of alpha olefins and ammonia is heated separately from the oxygen and then introduced into the reaction zone. The diluent may be added to the reaction zone with the reactants mixture or heated separate therefrom.

Although a variety of reactors may be used in the practice of this invention, reactors containing bundles of small diameter tubes that have been coated with the catalytic metal oxide are preferred. Any type of reactor in which the ratio of catalyst surface area to reaction zone free volume is maintained without creating excessive flow restrictions or back pressures may be used with good results.

In the following examples of the invention, percent conversion refers to the mols of alpha olefin consumed per 100 mols of alpha olefin fed into the reaction zone; selectivity represents the mols of unsaturated nitriles formed per 100 mols of alpha olefin consumed; percent ammonia selectivity or ammonia efficiency, as the term is used in the disclosure, represents the mols of nitriles formed per 100 mols of ammonia consumed.

All the runs in the examples were made in a 24-inch 304 stainless steel reactor having an internal diameter of 22 mm. Heat was supplied to the reactors by a dual unit electric furnace, each unit being 12 inches long and separately controlled by a voltage regulator. The gases were metered through calibrated rotameters to a manifold at the head of the reactor. The effluent gases were sampled through a sampling port located just below the heated portions of the reactor. The reactants were mixed in a manifold and introduced directly to the reaction zone. The steam diluent was superheated prior to introduction into the reaction zone.

EXAMPLE 1

The 27 mm. diameter stainless steel reactor tube was placed horizontally in a dual electric furnace and heated to a temperature of about 250° C. A platinum boat containing 0.9 gram of molybdenum trioxide was placed inside the steel reactor at the inlet end about 3 inches from the outer edge of the electric furnace. A stream of air was passed through the heated steel reactor and over the platinum boat. A partial vacuum was pulled at the outlet end of the steel reactor. The inlet portion of the steel reactor, containing the platinum boat, was heated to red heat to vaporize the molybdenum trioxide. By this procedure the vaporized molybdenum trioxide was sublimed onto the walls of the heated steel reactor. After a thin layer of crystalline molybdenum trioxide had been deposited on the walls of the reactor, the heat was discontinued and the reactor cooled and placed in an upright position. After connecting the inlet feed lines to the manifold and tying the manifold into the reactor, the reactor was heated to 560° C. Isobutylene was introduced into the reaction zone at a rate of 164 cc./mm. Oxygen, ammonina, and steam were introduced into the reaction zone in a mol ratio of one mol of isobutylene, two mols of oxygen, two mols of ammonia and 8.9 mols of steam respectively. The catalyst surface area to reaction zone free volume was 5 to 1. A residence time of two seconds was maintained. 19.0 mol percent of the isobutylene was converted, with a methacrylonitrile selectivity of 60 mol percent. The ammonia selectivity was 81.6 percent.

EXAMPLE 2

Example 1 was repeated with the exception that the coated steel reactor was replaced with a non-coated reactor filled with a catalyst consisting of 10 percent $MoO_3$ deposited on ⅛" alumina pellets. All other operating conditions were the same as in Example 1. 11.1 mol percent of the isobutylene was converted to methacrylonitrile at a selectivity of 28.4 mol percent and the ammonia selectivity for this run was below 20 mol percent.

EXAMPLE 3

A reactor having deposited on the inner walls a catalyst containing 40 percent $Cr_2O_3$, 50 percent $MoO_3$ and 10 percent $P_2O_5$ was prepared by first impregnating powdered alpha alumina, of about 5 to 10 microns in size, with a water solution of chromium and molybdeum salts and phosphoric acid. The slurry was then deposited on the inner wall of a stainless steel tube reactor and the reactor heated to dry the catalyst. The tube was heated to 200° C. to convert the salts to the oxides. Molar ratios of isobutylene to oxygen, ammonia and steam of 1/2/2/8.9 were fed to the reactor. The wall coated reaction zone was maintained at a maximum temperature of 550° C. The ratio of catalyst surface to reaction zone free volume was 1:1. Chromatograhpic analysis of the effluent sampled just prior to the reaction effluents entrance into an acid scrubber showed that about 20 percent of the isobutylene was converted, of which 62.6 percent was methacrylonitrile. The ammonia selectivity was maintained at a speedy 72 percent. When this catalyst was deposited on ⁹⁄₁₆ inch alumina pellets and used in a fixed bed, much lower selectivities are obtained and high loss of ammonia was observed. In this latter run the ratio of catalyst surface to reaction zone free volume was greater than 1,000 to 1.

EXAMPLE 4

A reactor tube was coated by the technique described in Example 3 with a catalyst having a composition consisting essentially of 74.3 percent $V_2O_5$, 25.2 percent $MoO_3$, and 0.5 percent $P_2O_5$. The ratio of catalyst surface to free volume was 5 to 1. The reactor was heated to a reaction temperature of about 560° C. A reaction mixture of isobutylene, oxygen, ammonia and water was introduced into the reaction zone in a molar ratio of

1/1.5/2/3.55

A residence time of 4.0 seconds was maintained throughout the run. Chromatographic analysis of the reactor effluent indicated that 43.7 mol percent of the isobutylene was converted with a methacrylonitrile selectivity of 41.0 mol percent. The ammonia selectivity to nitriles was 93 mol percent.

EXAMPLE 5

Example 4 was repeated with the exception that the catalyst was prepared by impregnating ⅛" Alundum pellets with a nitric acid solution of the oxides, and after drying and heating, the catalyst pellets were placed in a clean reactor tube. A non-coated stainless steel reactor was used. The ratio of catalyst surface area to reaction zone free volume was in excess of 300 to 1. All other operating conditions were held constant. 24.9 mol percent of the isobutylene was converted at a selectivity to methacrylonitrile of 40.5 mol percent. The ammonia selectivity for this run was only 17.4 mol percent compared to 93 mol percent in the run in Example 4 where the critical ratio of catalyst surface to reactor space was observed.

By using a coated tube reactor rather than the usual fixed bed of small particle size and large surface catalyst, good selectivity to methacrylonitrile, more efficient utilization of ammonia, absence of local or hot spot overheating, use of less catalyst and a higher concentration of reactants are realized quite unexpectedly.

We claim:

1. A process for the production of methacrylonitrile comprising contacting isobutylene in a tubular reactor at a temperature between about 450° C. and 650° C. with oxygen and ammonia with a catalyst consisting essentially of a member selected from the group consisting of molybdenum oxide and molybdenum oxide admixed with at least one of vanadium oxide, chromium oxide, tungsten oxide, iron oxide, nickel oxide or phosphorus pentoxide, said catalyst being present on the walls of the tubular reactor and having a catalyst surface area to reaction zone free volume ratio of between 0.01 to 50 square inches per cubic inch of free volume, said oxygen being present in mol ratios between about 1 to 4 mols of oxygen per mol of isobutylene and said ammonia being present in mol ratios between about 1 to 9 mols of ammonia per mol of isobutylene.

2. The process of claim 1 wherein steam is present in amount from 1.5 to 20 mols per mol of isobutylene.

3. A process for the production of methacrylonitrile comprising contacting isobutylene in a tubular reactor at a temperature between about 450° C. and 650° C. with oxygen and ammonia with a catalyst consisting essentially of molybdenum oxide, said catalyst being present on the walls of the tubular reactor and having a catalyst surface area to reaction zone free volume ratio of between 0.1 to 25 square inches per cubic inch of free volume, said oxygen being present in mol ratios between about 1 to 4 mols of oxygen per mol of isobutylene and said ammonia being present in mol ratios between about 1 to 9 mols of ammonia per mol of isobutylene.

4. A process for the production of methacrylonitrile comprising contacting isobutylene in a tubular reactor at a temperature between about 450° C. to 650° C. with oxygen in amounts from one to 4 mols of oxygen per mol of isobutylene and ammonia in amounts from one to 9 mols of ammonia per mol of isobutylene with a metal oxide catalyst consisting essentially of 10 to 60 weight percent chromium oxide, 25 to 85 weight percent molybdenum oxide and 5 to 15 weight percent phosphorus pentoxide deposited on the reactor walls, said catalyst having a catalyst surface area to reaction zone free volume ratio of between 0.1 to 25 square inches per cubic inch of free volume.

5. A process for the production of methacrylonitrile comprising contacting isobutylene in a tubular reactor at a temperature between about 450° C. to 650° C. with oxygen in amounts from one to 4 mols of oxygen per mol of isobutylene and ammonia in amounts from one to 9 mols of ammonia per mol of isobutylene with a metal oxide catalyst consisting essentially of 10 to 75 weight percent vanadium pentoxide, 25 to 89 weight percent molybdenum oxide and 0.1 to 15 weight percent phosphorus pentoxide deposited on the reactor walls, said catalyst having a catalyst surface area to reaction zone free volume ratio of between 0.1 to 25 square inches per cubic inch of free volume.

References Cited

UNITED STATES PATENTS

| | | | |
|---|---|---|---|
| 2,904,580 | 9/1959 | Idol | 260—465.3 |
| 3,153,665 | 10/1964 | Roelen et al. | 260—465.3 |

FOREIGN PATENTS 635,328    1/1962   Canada.

JOSEPH P. BRUST, *Primary Examiner.*

CHARLES B. PARKER, *Examiner.*